(12) United States Patent
Gysling et al.

(10) Patent No.: US 7,831,398 B2
(45) Date of Patent: Nov. 9, 2010

(54) METHOD FOR QUANTIFYING VARYING PROPAGATION CHARACTERISTICS OF NORMAL INCIDENT ULTRASONIC SIGNALS AS USED IN CORRELATION BASED FLOW MEASUREMENT

(75) Inventors: Daniel L. Gysling, Glastonbury, CT (US); Charles Winston, Glastonbury, CT (US)

(73) Assignee: Expro Meters, Inc., Wallingford, CT (US)

( * ) Notice: Subject to any disclaimer, the term of this patent is extended or adjusted under 35 U.S.C. 154(b) by 0 days.

(21) Appl. No.: 12/339,552

(22) Filed: Dec. 19, 2008

(65) Prior Publication Data

US 2009/0158858 A1 Jun. 25, 2009

Related U.S. Application Data

(60) Provisional application No. 60/015,428, filed on Dec. 20, 2007.

(51) Int. Cl.
*G06F 19/00* (2006.01)
*G01F 1/00* (2006.01)

(52) U.S. Cl. ...................... 702/54; 73/861.27
(58) Field of Classification Search .................. 702/45, 702/48, 54; 73/861.27
See application file for complete search history.

(56) References Cited

U.S. PATENT DOCUMENTS

| 5,228,347 | A * | 7/1993 | Lowell et al. ............ 73/861.28 |
| 6,354,147 | B1 | 3/2002 | Gysling et al. |
| 6,481,288 | B1 | 11/2002 | Humphrey et al. |
| 6,550,345 | B1 | 4/2003 | Letton |
| 6,634,239 | B2 | 10/2003 | Gomm et al. |
| 6,889,562 | B2 | 5/2005 | Gysling et al. |
| 7,096,719 | B2 | 8/2006 | Gysling |

(Continued)

FOREIGN PATENT DOCUMENTS

DE 4306119 9/1994

(Continued)

OTHER PUBLICATIONS

Jacobson et al., "A New Method for the Demodulation of Ultrasonic Signals for Cross-Correlation Flowmeters," Ultrasonics, May 1985, pp. 128-132.

*Primary Examiner*—Bryan Bui
(74) *Attorney, Agent, or Firm*—O'Shea Getz P.C.

(57) ABSTRACT

According to the present invention, a method is provided for sensing a fluid flow within a pipe having a lengthwise axis to determine a parameter of the fluid flow. The method includes the following steps: a) providing an array of more than two ultrasonic sensors, each sensor having a transmitter and a receiver; b) disposing the transmitter and receiver of each sensor orthogonally relative to the lengthwise axis of the pipe; c) receiving ultrasonic signals using the receivers, which received signals result from initial signals transmitted from the transmitters of the ultrasonic sensors; d) processing the received signals from each sensor by projecting the received signals against a sine function and a cosine function, high pass filtering the projected signals, and using the high pass filtered projections to create an arrival vector within a complex plane, wherein the high pass filtered arrival vector is a rectified frequency doubled signal; and e) determining the parameter of the fluid flow using the arrival vector.

5 Claims, 7 Drawing Sheets

U.S. PATENT DOCUMENTS

| | | |
|---|---|---|
| 7,261,002 B1 | 8/2007 | Gysling et al. |
| 7,295,933 B2 | 11/2007 | Gysling et al. |
| 7,322,245 B2 | 1/2008 | Gysling et al. |
| 7,331,233 B2 | 2/2008 | Scott |
| 7,343,818 B2 | 3/2008 | Gysling |
| 7,389,187 B2 | 6/2008 | Kersey et al. |
| 7,400,985 B2 | 7/2008 | Fernald et al. |
| 7,418,877 B2 | 9/2008 | Gysling |
| 2008/0098818 A1 | 5/2008 | Fernald et al. |
| 2008/0098824 A1 | 5/2008 | Bailey et al. |
| 2008/0173100 A1 | 7/2008 | Davis |

FOREIGN PATENT DOCUMENTS

| | | |
|---|---|---|
| GB | 2210169 | 6/1989 |
| WO | 9314382 | 7/1993 |

\* cited by examiner

METHOD FOR QUANTIFYING VARYING PROPAGATION CHARACTERISTICS OF NORMAL INCIDENT ULTRASONIC SIGNALS AS USED IN CORRELATION BASED FLOW MEASUREMENT

CROSS-REFERENCE TO RELATED PATENT APPLICATIONS

This application claims the benefit of U.S. Provisional Patent Application No. 61/015,428 filed Dec. 20, 2007, which is hereby incorporated by reference herein in its entirety.

BACKGROUND OF THE INVENTION

1. Technical Field

This invention relates to methods for determining flow parameters of a fluid flow within a pipe using normal incident ultrasonic signals for correlation based flow measurement in general, and to methods for quantifying modulating portions of normal incident ultrasonic signals propagating across the diameter of a pipe in particular.

2. Background Information

Normal incident ultrasonic flow meters operate on the principle that flow within a pipe interacts with the propagation of normal incident ultrasonic beams traversing the pipe. Transit time, defined as the time required for an ultrasonic beam to propagate across the diameter of the pipe, can be measured using a radially aligned ultrasonic transmitter (Tx) and receiver (Rx). For an "ideal flow in a pipe" (e.g., a homogenous fluid with no transverse velocity components flowing in an infinitely rigid tube), the transit time may be given by the following relation:

$$t = D/A_{mix}$$

where t is the transit time, D is the diameter of the pipe, and $A_{mix}$ is the speed of sound propagating through the fluid.

In the aforesaid homogenous "ideal" fluid flow, variation in transit time is analogous to a variation in sound speed of the fluid. In "real" fluid flows as diagrammatically depicted in FIG. 1, however, there are many mechanisms (e.g., entrained air bubbles, particles, vortices, etc., referred to hereinafter as "coherent vortical structures") which: 1) convect with the fluid flow; 2) can cause small variations in normal incident ultrasonic signal transit time; and 3) remain spatially coherent for several pipe diameters. The term "spatially coherent for several pipe diameters" is used herein to refer to coherent vortical structures observed at one axial location which are subsequently observed to a degree at a downstream axial location after a period of time that is consistent with the time required for the structure to convect from the upstream to the downstream location. By monitoring the variations at two or more locations caused by the coherent vortical structures within the flow, the transit time of the variations between sensor locations can be processed to determine the velocity of the fluid flow.

To sense for such vortical structures, the ultrasonic transmitters (Tx) within an ultrasonic flow meter can be periodically pulsed to create the ultrasonic signal that transmits through the pipe and fluid. Each transmitter will have a fundamental oscillation frequency, which when pulsed will emit a short ultrasonic burst signal. In typical applications, the receiver, located on the opposite side of a pipe, will receive this signal once it has bisected the pipe. However, in addition to this primary through-transmitted signal (i.e., the fluid borne signal component), other secondary signals will also be detected. These secondary signals include portions of the original signal that have been refracted or reflected along a different path through the pipe than the preferred direct transmission. Often these secondary signals possess sufficient strength to still reach the receiver and will interfere with the desired signal.

The dominant secondary signal is the "ring-around" signal. This is the portion of the ultrasonic signal that travels circumferentially through the wall of the pipe and can still be detected by the receiver. Because ring-around noise travels through the pipe wall rather than the fluid, it cannot provide any fluid flow information. FIG. 2 diagrammatically illustrates through-transmitted signals 10, scattered through-transmitted signals 12, and ring-around signals 14 traveling circumferentially within the pipe wall 16. Ring-around signals are created through reflection and diffraction between the transmitting ultrasonic transducer, the pipe wall and the material present inside the pipe typically due to the large impedance mismatch between the various materials. As an example, the impedance of steel such as, for example, in steel piping, is 45 MRayls in contrast to fluid which has an impedance of 1.5 MRayls. In this case, only a small percentage of the ultrasonic signal is actually injected into the fluid flow while the rest is reflected throughout the overall system. The majority of this excess energy is present in the pipe wall in the form of shear and compressional ultrasonic waves. If one considers the fact that the through-transmitted signal can be significantly attenuated as it travels through the fluid in the pipe, it becomes clear that it can be very difficult to distinguish the wanted signal from all the secondary signals.

It should be appreciated that the quality of any flow measurement, independent of the technology, is typically dependent upon the signal to noise (S/N) ratio. Noise, in this case, is defined as any portion of the measured signal that contains no fluid flow information. It is desirable to maximize the S/N ratio to obtain optimum performance.

Under ideal conditions, the ratio of the signal passing through the fluid to the ring-around noise is high (and/or the differential TOF between the signals is large) and it is relatively easy to produce the signal information required to make a flow measurement. On the contrary, in situations where the through-transmitted signal is significantly attenuated, and/or the ring-around signal arrives before the through-transmitted signal and is of the same temporal frequency, and/or the amplitude of the ring-around signal is significantly larger than the through-transmitted signal, the S/N ratio can be substantially reduced and the flow measurement compromised. In particular, the flow measurement can be compromised because of phase and amplitude errors introduced by the "noise" components of the received signal.

What is needed is a method for quantifying the modulating portions of the normal incident ultrasonic signals propagating through the fluid flow passing within the pipe, which method creates a favorable S/N ratio, and therefore an increased accuracy flow meter.

SUMMARY OF THE INVENTION

According to the present invention, a method is provided for sensing a fluid flow within a pipe having a lengthwise axis to determine a parameter of the fluid flow. The method comprises the following steps: a) providing an array of more than two ultrasonic sensors, each sensor having a transmitter and a receiver; b) disposing the transmitter and receiver of each sensor orthogonally relative to the lengthwise axis of the pipe; c) receiving ultrasonic signals using the receivers, which received signals result from initial signals transmitted from the transmitters of the ultrasonic sensors; d) processing the received signals from each sensor by projecting the received signals against a sine function and a cosine function, high pass filtering the projected signals, and using the high pass filtered projections to create an arrival vector within a complex plane, wherein the high pass filtered arrival vector is a rectified frequency doubled signal; and e) determining the parameter of the fluid flow using the arrival vector.

An advantage of the present method is that it provides a method for sensing a fluid flow within a pipe that can be used with a ultrasonic flow meter having more than two sensors with signal processing that provides a greater signal to noise ratio, and less sensitivity to phase interference than existing ultrasonic flow meters of which we are aware. Using the present method, the processed signal is substantially insensitive to relative phase and amplitude of fluid borne and structural borne signal components. As a result, the signal processing for a flow meter having more than two ultrasonic sensors is facilitated.

The foregoing features and advantages of the present invention will become more apparent in light of the following detailed description of exemplary embodiments thereof.

DETAILED DESCRIPTION OF THE INVENTION

Figure 1:
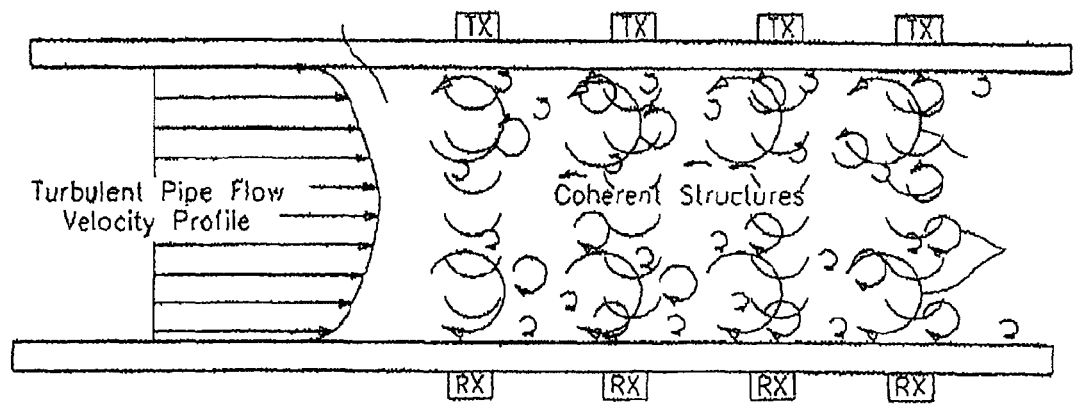
FIG. 1 is a schematic diagram of an ultrasonic flow meter having an array of ultrasonic sensor pairs axially disposed on a pipe, with a fluid flow disposed within the pipe.
Figure 2:
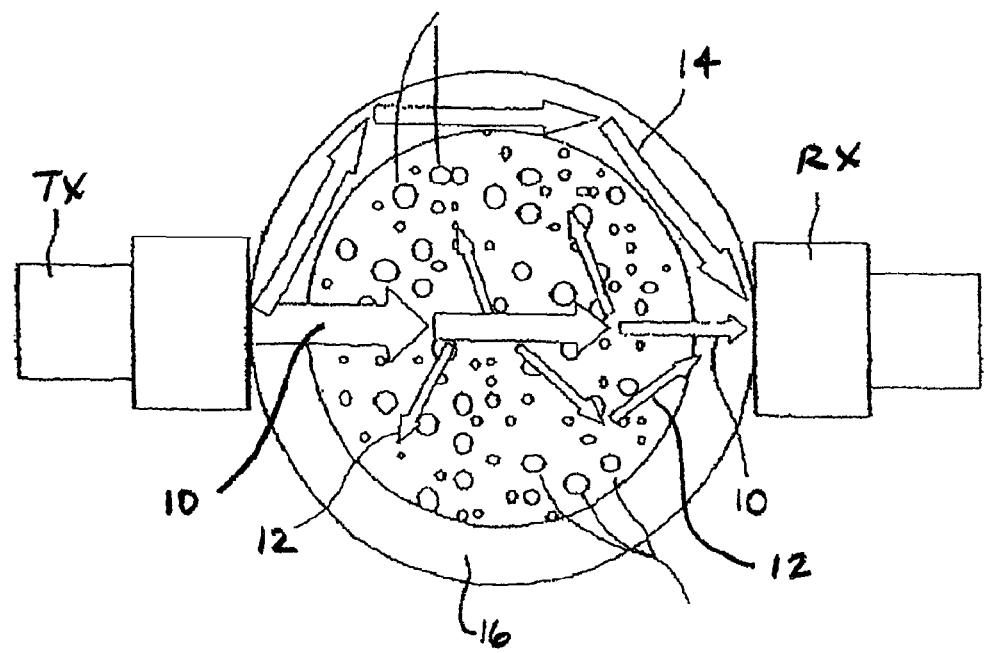
FIG. 2 is a block diagram of a flow meter having an array of ultrasonic sensor pairs axially disposed on a pipe.
Figure 3:
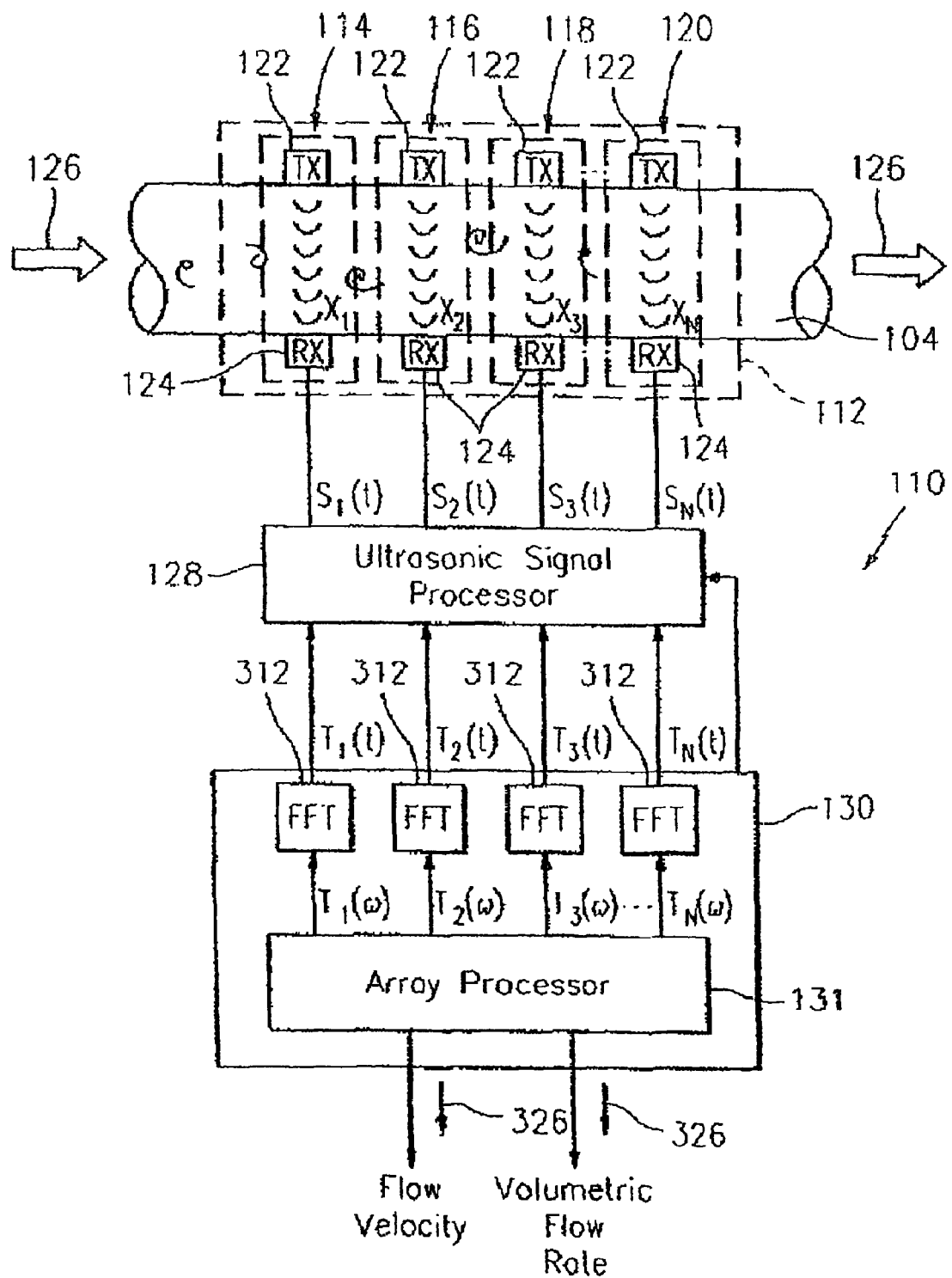
FIG. 3 is a diagrammatic diagram of an ultrasonic sensor attached to a pipe, cross-sectioned to illustrate the potential signal paths.

FIG. 3 diagrammatically illustrates an ultrasonic clamp-on flow meter, such as the one described in U.S. Patent Application Publication No. 2008/0098818, which document is hereby incorporated by reference in its entirety. The ultrasonic flow meter 110 includes an array 112 of ultrasonic sensors that includes a plurality of individual ultrasonic sensors 114, 116, 118 and 120 disposed axially along the length of a pipe 104. Each ultrasonic sensor 114, 116, 118 and 120 comprises a transmitter (TX) 122 and a receiver (RX) 124 pair. The transmitter 122 transmits an ultrasonic signal to the corresponding receiver 124 in a direction that is normal to the direction of the flow of a fluid 126. This embodiment of an ultrasonic flow meter 110 is an example of an acceptable ultrasonic flow meter. The present invention is not limited to this embodiment, however. For example, the present invention method can be used with ultrasonic flow meters having "N" number of sensors, where "N" is an integer larger than two (2), without departing from the scope of the invention.

The ultrasonic sensor units measure a transit time (also referred to as "time of flight" (TOF), or phase modulation) of an ultrasonic signal propagating through the fluid from the transmitter to the receiver. The transit time measurement or variation is indicative of something that convects with the fluid flow (e.g., vortical disturbances, inhomogenieties within the flow, temperature variations, bubbles, particles, pressure disturbances), which in turn is indicative of the velocity of the fluid flow. The ultrasonic sensors may operate at a variety of different frequencies. The optimum frequency of the ultrasonic sensor may depend on the size or type of coherent vortical disturbance convecting with the fluid flow. Examples of frequency used for a flow meter embodying the present invention are 1 MHz and 5 MHz. The ultrasonic sensors may provide a pulsed, chirped or continuous signal through the fluid flow. An example of an acceptable commercially available sensor is a model no. 113-241-591 ultrasonic sensor manufactured by Krautkramer Ultrasonic Systems.

An ultrasonic signal processor fires the sensors in response to a firing signal from the transmitter and receives the ultrasonic output signals $S_1(t)$-$S_N(t)$ from the sensors. The signal processor processes the data from each of the sensor units to provide an analog or digital output signal $T_1(t)$-$T_N(t)$ indicative of the TOF of the ultrasonic signal through the fluid flow. One such signal processor is model no. USPC 2100, manufactured by Krautkramer Ultrasonic Systems.

The ultrasonic sensors provide the transit time-varying signals $T_1(t), T_2(t), T_3(t) \ldots T_N(t)$ to a signal processor, which in turn provides signals to known Fast Fourier Transform (FFT) logics 312, respectively. The FFT logics calculate the Fourier transform of the time-based input signals $T_1(t)$-$T_N(t)$ and provide complex frequency domain (or frequency based) signals $T_1(\omega), T_2(\omega), T_3(\omega) \ldots T_N(\omega)$ indicative of the frequency content of the input signals. Instead of FFTs, any other technique for obtaining the frequency domain characteristics of the signals $T_1(t)$-$T_N(t)$, may be used. The frequency signals $T_1(\omega)$-$T_N(\omega)$ are fed to an array processor 131, which provides a flow signal indicative 326 of the volumetric flow rate of the fluid flow 126 and a velocity signal indicative of the velocity of the fluid flow 126.

Flow meters using cross-correlating signal processing are known in the art. U.S. Pat. Nos. 6,889,562 and 7,261,002, which are hereby incorporated by reference in their entirety, disclose techniques and apparatus for determining fluid flow parameters using cross-correlating processing logic.

As described above, when sensing fluid flow within a pipe using a normal incident ultrasonic cross-correlation flow meter, it can be difficult to distinguish the desirable ultrasonic signal components from the undesirable ultrasonic signal components; e.g., in those instances where the ring-around signal masks the through-transmitted signal. This is particularly true for flow meters having more than two ultrasonic sensors, where signals transmitted may fall out of phase during passage and create interference. The likelihood of signal phase interference increases with the number of ultrasonic sensors being used.

To overcome the aforesaid signal processing problems, the present method provides an improved methodology for measuring and processing the modulating (i.e., varying) portion of the transmitted signal received by the receivers.

In a theoretically ideal system, substantially all of the signal transmitted would pass through the immediate pipe wall, through the fluid flow, and through the opposite pipe wall, where it would be received by the receiver. In reality, however, it is likely that a portion of the signal will be reflected at each interface (e.g., transmitter/pipe wall, immediate pipe wall/fluid flow, fluid flow/opposite pipe wall, etc.). In addition, as stated above, a substantial amount of the transmitted signal will be lost to ring-around signal that travels circumferentially within the pipe wall.

To evaluate the ultrasonic signal received by the receiver, the present method considers the received signal as a sinusoidal wave in terms of a fluid borne portion and a structural borne portion. The received signal is further processed by projecting the received signal against a sine function and a cosine function of a predetermined frequency (f) over a period of time (t) after the signal has arrived at the receiver:

$$S1 = \int_{t=t_0}^{t_0+\frac{N}{f}} v_1(t)\sin(\omega t) dt \qquad \text{Eqn. 1}$$

$$C1 = \int_{t=t_0}^{t_0+\frac{N}{f}} v_1(t)\cos(\omega t) dt \qquad \text{Eqn. 2}$$

The predetermined frequency is typically selected to be substantially identical to the dominate frequency of the received signal.

Figure 4:
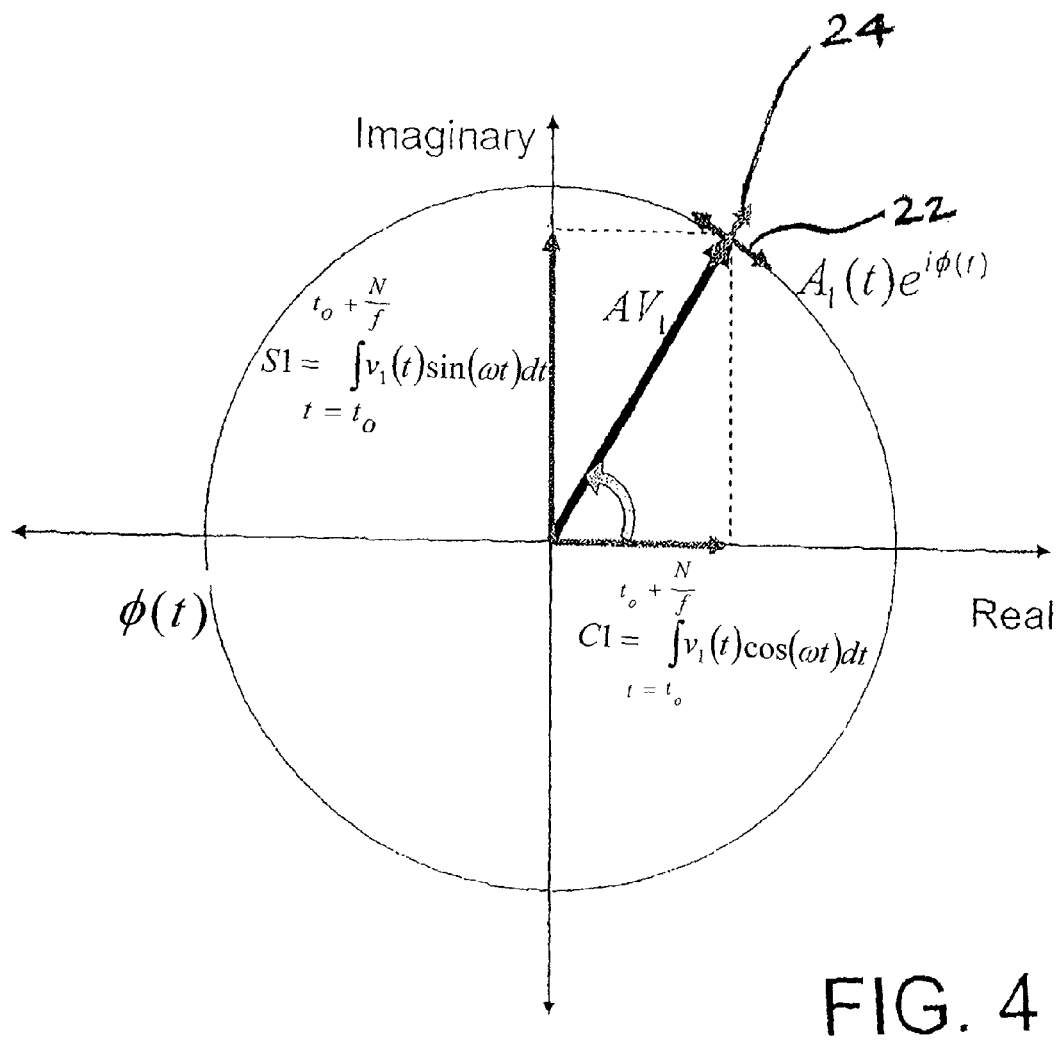
FIG. 4 is a complex plane diagram illustrating signal variations projected against a sine wave function and a cosine wave function, and collectively shown in the form of an arrival vector.

Modulations within the received signal can be viewed in a complex plane (e.g., as shown in FIG. 4), where the amplitude and phase of the received signal are given by the amplitude and phase of an "arrival vector", which is defined as:

$$AV_1 = C1 + iS1 = A_1(t)e^{i\phi(t)} \qquad \text{Eqn. 3}$$

Where $AV_1$ is the arrival vector, $A_1(t)$ is the amplitude of the arrival vector, and $\phi(t)$ is the phase of the arrival vector in the complex plane.

The amplitude and phase of the arrival vector in the complex plane can be expressed as follows:

$$A_1(t) = \sqrt{C1^2 + S1^2} \qquad \text{Eqn. 4}$$

$$\phi(t) = \tan^{-1}\left(\frac{S1}{C1}\right) \qquad \text{Eqn. 5}$$

In the complex plane, variations in the time required for the ultrasonic wave to propagate across the pipe will manifest themselves as variations in the phase of the arrival vector (indicated as tangent vectors 22) and variations in amplitude will manifest themselves as variation in the amplitude (indicated as normal vectors 24) of the arrival vector.

Thus in the model described above, the amplitude and/or phase for each pair of ultrasonic sensors can be determined and used as a signal to track the propagation of coherent structures. It should be noted that any coherent structure that both convects with the flow velocity and causes modulations in the propagation properties can be used with the present method.

There are, however, potential issues with using the aforesaid arrival vector approach. Consider, for example, a first scenario where there is only a fluid borne signal, and a second scenario where there is both a fluid borne signal component and a structural borne signal component. The fluid borne signal is identical in the two scenarios. The only difference between the two scenarios is presence of a time stationary structural-borne signal.

Figure 5:
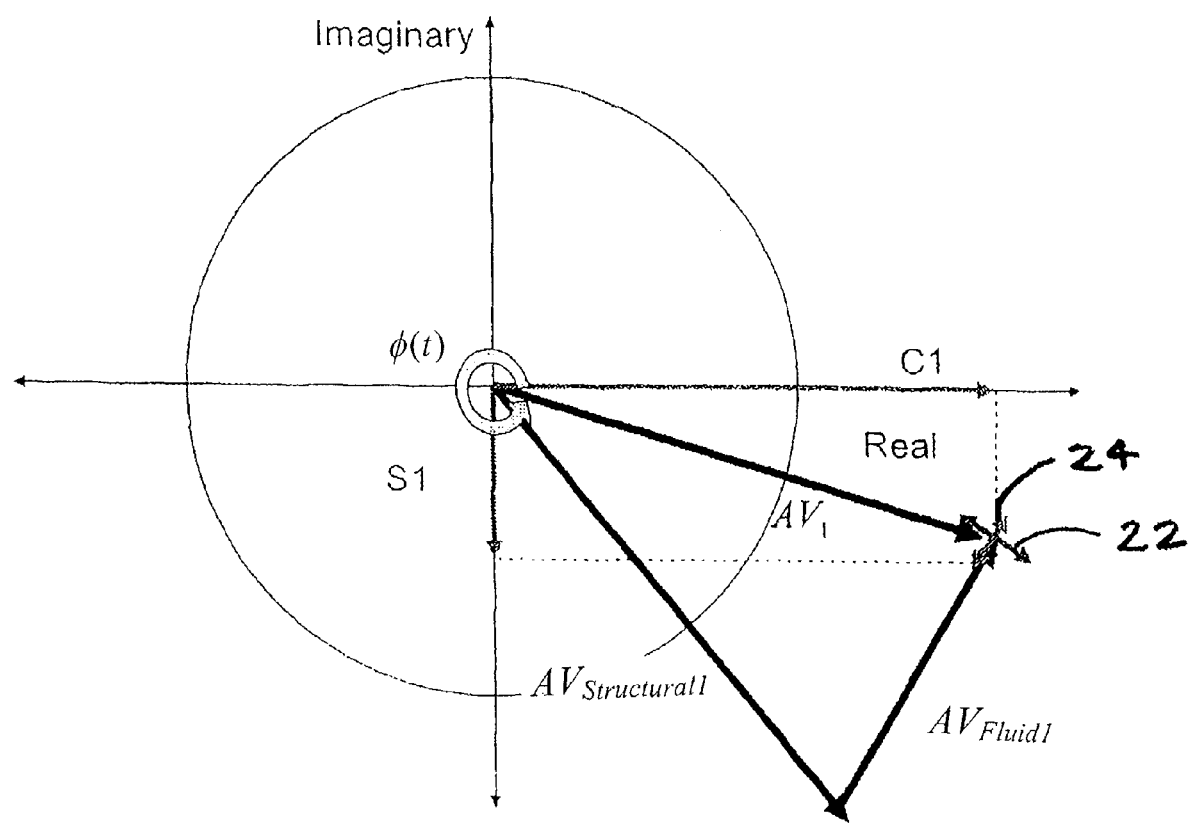
FIG. 5 is a complex plane diagram illustrating structural and fluid components of the received signal independently, and collectively in the form of an arrival vector.

The second scenario can be described in terms of complex plane diagrams shown in FIGS. 4 and 5. Modulations in the arrival time (i.e., phase) of the fluid component in the absence of any structural signal manifest themselves as modulations in the phase of the arrival vector. With the structural component of the arrival vector present ($AV_{structural1}$; see FIG. 5), modulations in the arrival time (i.e., phase) of the fluid borne arrival vector ($AV_{Fluid1}$) will, in general, manifest themselves as modulations in both phase and/or amplitude of the overall arrival vector, depending on the relative amplitude and phase of the component of the structural arrival vector.

Figure 6:
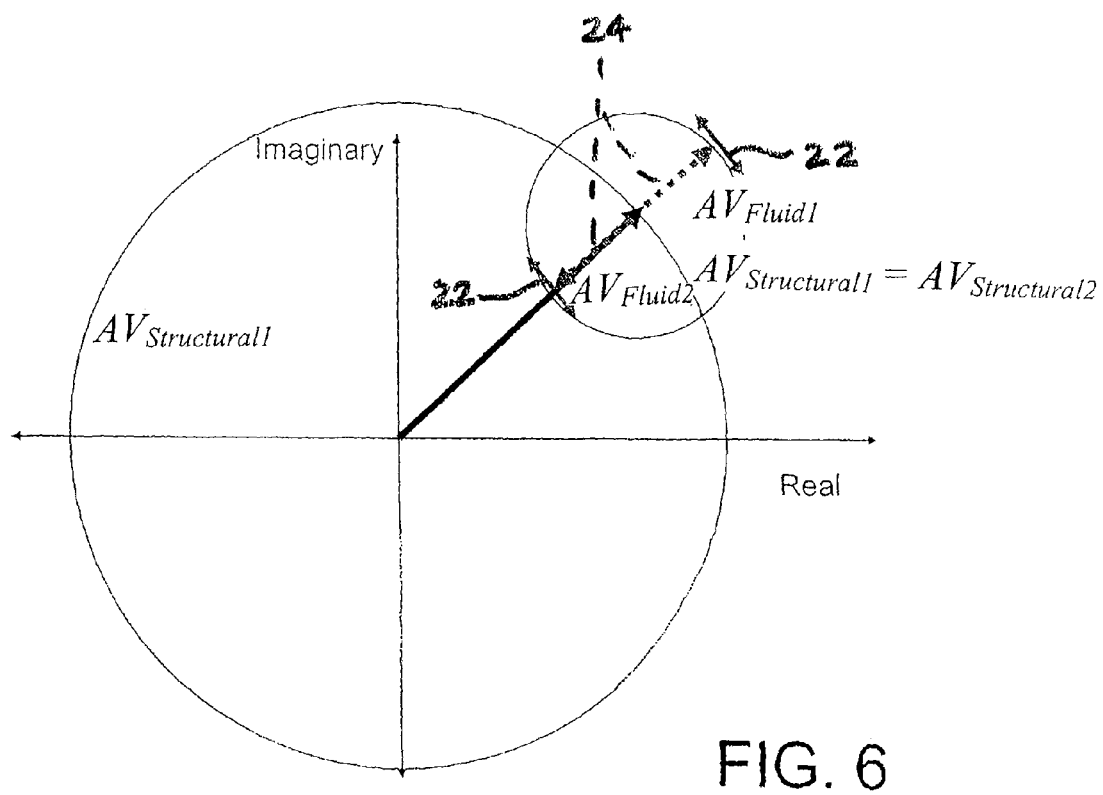
FIG. 6 is a complex plane diagram illustrating structural and fluid components of the received signal independently wherein the relative phase of the fluid and structural arrival vectors are 180° out of phase with one another.

Furthermore, the relative phase and amplitude of the structural borne and fluid borne arrival vectors will in general vary over time and from sensor pair to sensor pair. This variation in phase and amplitude between ultrasonic sensors within the array can result in several undesirable situations when attempting to determine flow rate from the correlations of variations in propagation properties along the array of normal incident sensors. In fact, the problem increases with the number of ultrasonic sensors within the array. FIG. 6 illustrates a hypothetical example where the relative phase of the fluid and structural arrival vectors are 180 degrees out of phase, resulting in the phase modulations of the respective overall arrival vectors being 180 degrees out of phase as well. In this scenario, a flow meter looking for an in phase correlation between two channels would have difficulty functioning.

Figure 7:
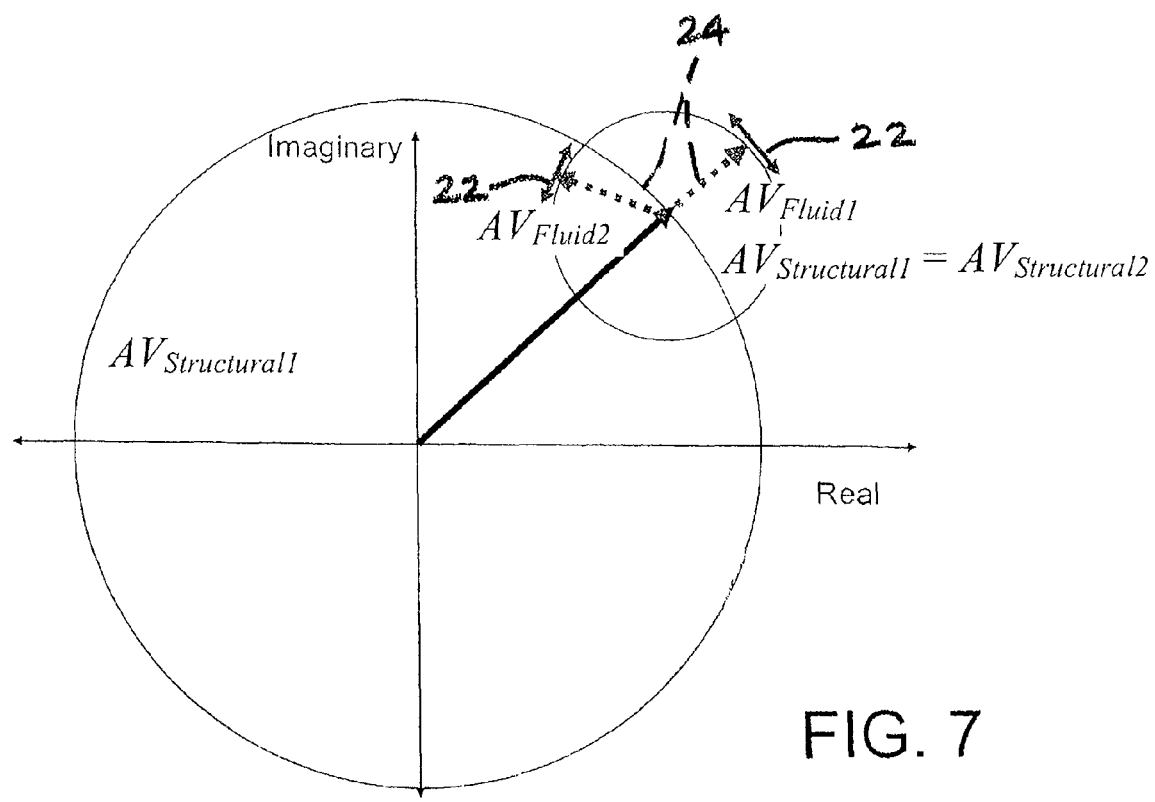
FIG. 7 is a complex plane diagram illustrating structural and fluid components of the received signal independently, wherein phase modulations are present in a first channel, and amplitude modulations are present in a second channel.

Referring to FIG. 7, another potential issue relating to the aforesaid arrival vector approach may arise when the relative phase of the fluid and structural components are such that fluid phase modulations results in phase modulation in a first channel, but only amplitude modulation in a second channel. As such, a two channel system tracking phase on both would not function in this scenario, and nor would an amplitude based system.

The above examples show conditions that would lead to operational problems for flow meters cross correlating two channels in which the relative amplitude and phase of the arrival vectors can fade in and out of phase with variations in the fluid and structural arrival vectors. The situation becomes substantially more complicated with higher channel count systems, in which variations in the relative phases and amplitudes of the propagation characteristics can significantly impair system performance.

Figure 8:
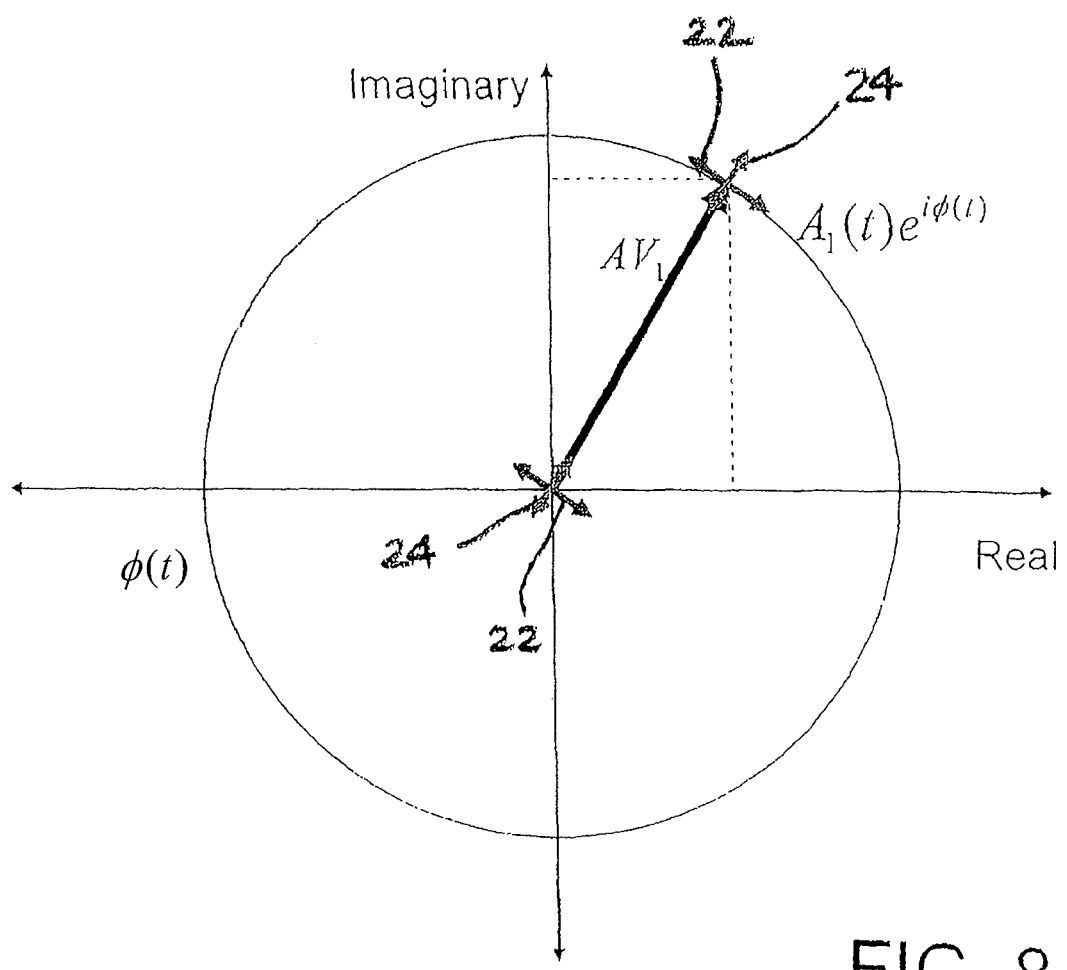
FIG. 8 is a complex plane diagram illustrating an arrival vector created by high pass filtering the cosine and sine projections of the signal variations.

Now referring to FIG. 8, the present invention method provides a solution to the aforesaid issues associated with the relative amplitude and phase of the fluid and the structural components of the arrival vector. The method involves high pass filtering the sine and cosine projections of the arrival vector to construct a new arrival vector (ARHP) composed of the high-passed component. The new arrival vector is preferably oriented to pass through the origin of the complex plane For a sinusoidal oscillation in either the amplitude or the phase of the fluid borne component of the arrival vector (i.e., the portion of the arrival vector contained desirable information regarding the fluid flow), the amplitude of the high passed arrival vector exhibits a rectified frequency doubled signal. In this form, the resulting amplitude signal is unchanged by reversing the sign of the new arrival vector (or equivalently rotating the high passed arrival vector by 180 degrees in the complex plane). This independence of the amplitude signal to 180 degree phase changes provides significant robustness to the cross correlation algorithm. For example, 180 degree phase changes in measured propagation characteristic such as amplitude and phase of the measured arrival vector can be associated with identical changes in the fluid arrival vector. In the absence of the present method, these phase changes may be unobservable; e.g., if the relative phase of the fluid and the structural arrival vectors oppose one another. Using the present method, the correlation of the amplitude of the high passed arrival vector is insensitive to relative phase and amplitude of the fluid and structural arrival vectors. Advantages provided by the present method are particularly apparent when the present method is used with ultrasonic flow meters having more than two channels, because of the above mentioned potential for variations in the relative phases and amplitudes of the propagation characteristics between sensors within the array.

The high passed arrival vector, and the modulations thereof, is subsequently utilized to determine one or more parameters (e.g., velocity) of the fluid flow within the pipe. The characteristics of the arrival vector (e.g., amplitude, phase) from each sensor can be processed utilizing cross-correlation techniques or SONAR techniques to determine one or more parameters (e.g., velocity) of the fluid flow within the pipe.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

For example, the present invention includes the use of quadrature techniques to determine variations in the propagation characteristics (amplitude, phase, cosine projection, sine projection, combinations thereof) of normal incidence ultrasonic waves, which variations can be processed using cross-correlation to determine desired flow characteristics; e.g., flow velocity. In alternative embodiments, the variations in the propagation characteristics can be processed using SONAR techniques to determine the desired flow characteristics; i.e., techniques known in the art for using a spatial (or phased) array of sensors to determine the direction of an acoustic source in three dimensional sound field with a known speed of sound. Some of such known techniques are described in the following references, which are incorporated herein by reference: H. Krim, M. Viberg, "Two Decades of Array Signal Processing Research—The Parametric Approach", IEEE Signal Processing Magazine, pp 67-94, R. Nielson, "Sonar Signal Processing", Ch. 2, pp 51-59.

What is claimed is:

1. A method for sensing a fluid flow within a pipe having a lengthwise axis to determine a parameter of the fluid flow, the method comprising:

providing an array of more than two ultrasonic sensors, each sensor having a transmitter and a receiver;

disposing the transmitter and receiver of each sensor orthogonally relative to the lengthwise axis of the pipe;

receiving ultrasonic signals using the receivers, which received signals result from initial signals transmitted from the transmitters of the ultrasonic sensors;

processing the received signals from each sensor by projecting the received signals against a sine function and a cosine function, high pass filtering the projected signals, and using the high pass filtered projections to create an arrival vector within a complex plane, wherein the high pass filtered arrival vector is a rectified frequency doubled signal; and determining the parameter of the fluid flow using the arrival vector.

2. The method of claim 1, wherein the received ultrasonic signals have a dominate frequency, and the sine function and cosine function are functions of a predetermined frequency that is substantially the same as the dominate frequency.

3. The method of claim 1, wherein the arrival vector has a phase and an amplitude, and the arrival vector modulates as a function of one or both of the amplitude and phase.

4. The method of claim 1, wherein the step of processing further includes cross-correlation techniques to compare the processed received signals from each sensor to other sensors within the array.

5. The method of claim 1, wherein the step of processing further includes SONAR techniques to compare the processed received signals from each sensor to other sensors within the array.

* * * * *